United States Patent
Jung et al.

(10) Patent No.: US 6,546,141 B1
(45) Date of Patent: Apr. 8, 2003

(54) ADAPTIVE PREDICTIVE CODING OF 2D OR 3D MESH INFORMATION

(75) Inventors: Seok-yoon Jung, Seoul (KR); Sung-jin Kim, Suwon (KR); Mahn-jin Han, Seoul (KR); Euee-seon Jang, Suwon (KR); Mun-sup Song, Yongin (KR); Yang-seock Seo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/362,983

(22) Filed: Jul. 30, 1999

(30) Foreign Application Priority Data

Nov. 28, 1998 (KR) .............................. 98-51476
May 29, 1999 (KR) .............................. 99-19621

(51) Int. Cl.$^7$ .............................. G06K 9/36; G06K 9/46
(52) U.S. Cl. ...................................... 382/238; 382/239
(58) Field of Search ................................ 382/232, 238, 382/247, 239

(56) References Cited

U.S. PATENT DOCUMENTS 5,592,228 A * 1/1997 Dachiku et al. ............ 382/241
5,798,751 A * 8/1998 Kanda .................... 375/240.26
6,205,254 B1 * 3/2001 Koshi et al. ................. 382/239
6,249,611 B1 * 6/2001 Broussard et al. .......... 382/232

OTHER PUBLICATIONS

Gonzalez et al., Digital Image Processing, 1992, Addison–Wesley, p. 313.*

* cited by examiner

*Primary Examiner*—Timothy M. Johnson
(74) *Attorney, Agent, or Firm*—Burns Doane Swecker & Mathis, LLP

(57) ABSTRACT

In a prediction method usable with synthetic and natural hybrid coding (SNHC) field or a virtual reality markup language (VRML) the difference between immediately prior information (most adjacent information) and input property information is obtained, considering the immediately prior information as the prediction value. The difference is used as a prediction error signal. A predictor having an order of 1 is used. When the output value of the predictor is fixed to 0, the prediction error signal becomes identical to an original signal. Therefore, the operation is the same as in the case where there is no predictor. The correlation of the input property information is used in order to control two operation modes of the predictor. Namely, auto-correlation is obtained from the input property information.

4 Claims, 3 Drawing Sheets

ADAPTIVE PREDICTIVE CODING OF 2D OR 3D MESH INFORMATION

BACKGROUND OF THE INVENTION

1. Field of the Invention

The present invention relates to an apparatus for coding property information of a two or three dimensional mesh object used in a synthetic and natural hybrid coding (SNHC) field or a virtual reality markup language (VRML) and a method therefor.

2. Description of the Related Art

In order to display one complete three dimensional object, after dividing the surface of an object into triangles or polygons, information on the positions of the respective vertices and the positions, colors, normal vectors, and texture information of the respective divided surfaces should be described. In the present invention, in a method for reducing the amount of three dimensional information having such a structure, an effective prediction method is provided with respect to coding of color information.

In conventional methods for coding a mesh object, a method for coding color information is the same as methods for coding the information on the positions of the respective vertices, the information on the normal vectors of the respective surfaces, and the information on textures to cover the respective surfaces. Namely, as shown in FIG. 1, respective input items of information are quantized by a quantizer 10 having an appropriate quantization distance. A predictor 14 calculates a prediction value by an appropriate prediction method using a plurality of items of past information stored in a memory 12 and delayed. An encoder 16 encodes the difference between a value quantized by the quantizer 10 and the prediction value calculated by the predictor 14.

FIG. 2 shows a parallelogram predicting method among predicting methods used by the predictor 14. In the parallelogram predicting method, a difference value is obtained using property information $P_0$ of a position to be encoded (for example, the information on the positions of the vertices, the information on the normal vectors, the texture information or the color information) and property information items $P_1$, $P_2$, and $P_3$ of three adjacent places as follows. Namely, the parallelogram shown in FIG. 2 is obtained using the property information items $P_1$, $P_2$, and $P_3$ of the three adjacent places. A prediction value $\tilde{P}_0$ of one remaining place of the parallelogram is obtained by the three adjacent places. The coding is performed by supplying a difference $P_0 - \tilde{P}_0$ between the prediction value $\tilde{P}_0$ and the property information $P_0$ to be encoded by the encoder. In the respective surfaces constructing the mesh, it is experimentally established that the encoding efficiency is improved when the information on the positions of the vertices is encoded by the predicting method. However, the following problems are generated when prediction coding is performed with respect to the property information by the conventional prediction method.

1. The range of a prediction error signal increases.

When the prediction is performed by a parallelogram predictor, the range of the property information becomes larger than that of an original signal. Namely, when $P_1 = P_3 =$ MAX and $P_2 =$ MIN, the prediction value becomes (2MAX−MIN) which is much larger than the range of an original signal (MAX−MIN). Here, MAX and MIN respectively refer to the maximum value and the minimum value of the original signal. As the range of the prediction value becomes large, the range of an error signal becomes large, thus deteriorating the efficiency of the encoder.

2. Prediction is performed using information items having low correlation.

In a three dimensional mesh, even the closest vertices may be separated from each other by a considerable distance in space. Therefore, in most cases, even adjacent vertices have low correlation with respect to property information. Therefore, prediction results obtained using vertices separated from each other and having low correlation in order to obtain the prediction value of the property information have a large error, which deteriorates the encoding efficiency.

Due to the above problems, it is not possible to effectively reduce the amount of information with respect to property information by the prediction error coding performed by the parallelogram predicting method of FIG. 2. The predicting methods using a plurality of adjacent property information items in which the property information items of the peripheral vertices or surfaces are averaged, also deteriorate the coding efficiency when correlation is low.

SUMMARY OF THE INVENTION

It is an objective of the present invention to provide an apparatus for encoding property information of a two or three dimensional mesh object and a method therefor, by which it is possible to effectively compress the property information of the surface of an object when a three dimensional object is expressed by a three dimensional mesh.

Accordingly, to achieve the above objective, the following methods are provided in the present invention. In the prediction method, property information items of a plurality of adjacent positions are not used. The difference between immediately prior information (most adjacent information) and input property information is obtained, considering the immediately prior information as the prediction value. The difference is used as a prediction error signal. Namely, in the present invention, a predictor having an order of 1 is used. The above predictor is used when the correlation between adjacent information items of input property information items is high, and is not used when the correlation is low. Namely, when the output value of the predictor is fixed to 0, the prediction error signal becomes identical to an original signal. Therefore, the operation is the same as in the case where there is no predictor. The correlation of the input property information is used in order to control two operation modes of the predictor. Namely, auto-correlation is obtained from the input property information. The predictor is used when correlation with an adjacent position is large. When the correlation is low, the predictor is fixed to 0. According to experimental results, coding efficiency is high when the predictor is used for the case where the correlation is larger than 0.9, and when no predictor is used, namely, the input property information is encoded as it is, for the case where the correlation is less than 0.9.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Hereinafter, the present invention will be described in detail with reference to the attached drawings.

Figure 1:
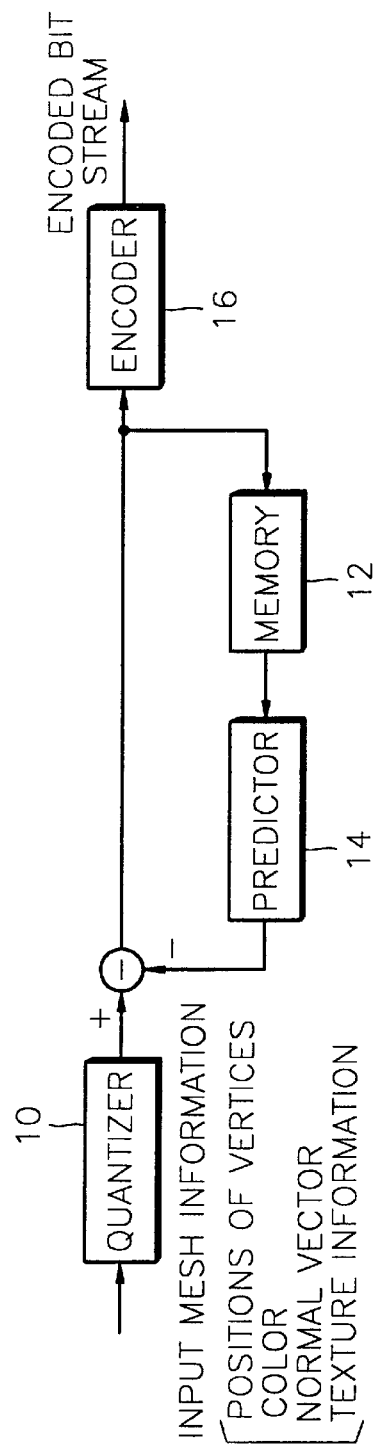
FIG. 1 is a block diagram showing the structure of an apparatus for encoding mesh information according to a conventional technology.
Figure 2:
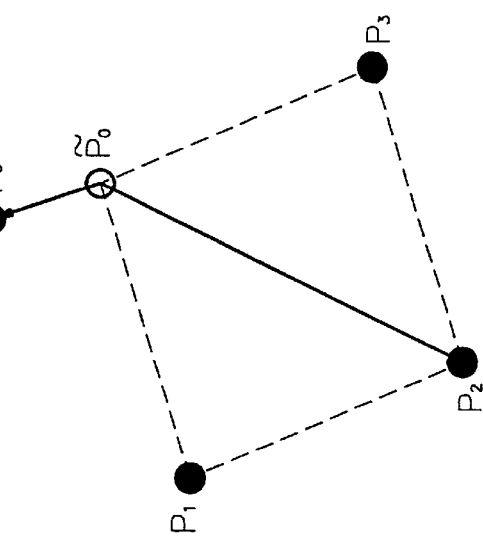
FIG. 2 is a view for describing a parallelogram predicting method according to the conventional technology.
Figure 3:
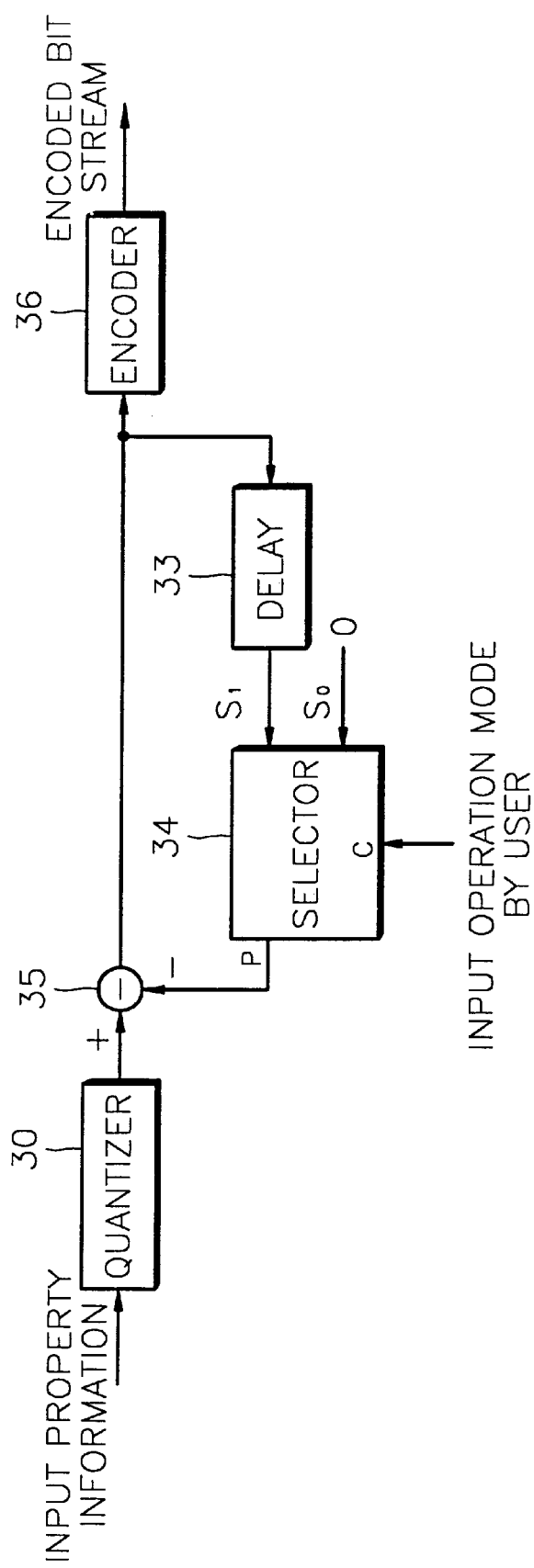
FIG. 3 is a block diagram showing the structure of an embodiment of a property information encoder according to the present invention.

Referring to FIG. 3, an embodiment of a property information encoding apparatus according to the present invention includes a quantizer 30, a delay 33, a selector 34, a subtracter 35, and an encoder 36.

The quantizer 30 quantizes input property information.

A delay 33 for delaying immediately prior property information and providing the delayed immediately prior property information as a prediction value of the next property information or a predictor according to a conventional method for combining current property information with property information items of a plurality of adjacent positions and outputting the combination result as a prediction value with respect to the current property information, can be used as the predictor which is a unit for predicting currently input property information.

The selector 34 selects either a prediction value output from the delay 33 or a predetermined value according to the characteristic of the input property information, and outputs the selected value. The subtracter 35 subtracts the value output from the selector 34 from the value output from the quantizer 30. In another embodiment of the present invention, the selector 34 operates in either a selection mode of selecting either the prediction value output from the delay 33 or 0, and outputting the selected value, or a fixed mode of outputting the prediction value output from the predictor. The selection mode is input by a user.

The encoder 36 compresses the information of a prediction error signal output from the subtracter 35. A lossless encoder such as an entropy encoder is most suitable for the encoder 36 used in the present invention.

Figure 4:
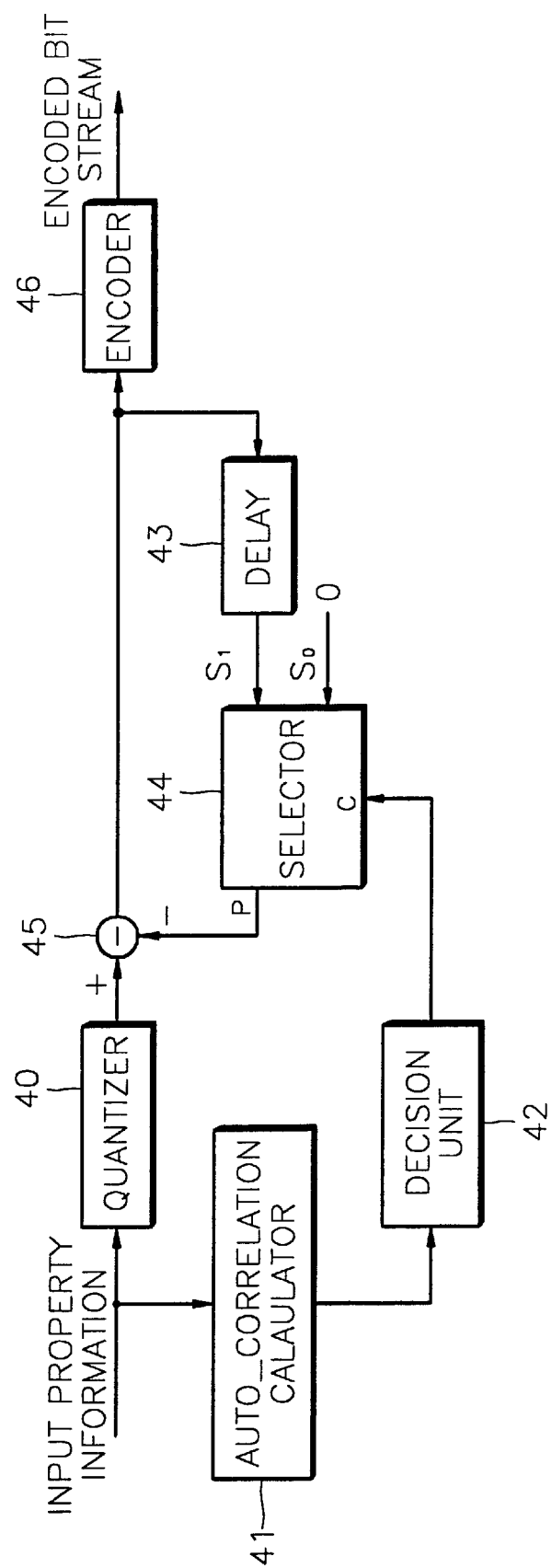
FIG. 4 is a block diagram showing the structure of another embodiment of a property information encoder according to the present invention.

Referring to FIG. 4, another embodiment of a property information encoding apparatus according to the present invention includes a quantizer 40, a delay 43 used for predicting, a selector 44, a subtracter 45 and an encoder 46 similar to FIG. 3 and further includes an auto-correlation calculating unit 41 and a decision unit 42.

The auto-correlation calculator 41 calculates the auto-correlation of the input property information items. The decision unit 42 generates a control signal so that the selector 44 can select a predicting method according to the auto-correlation. Therefore, the selector 44 selects either the prediction value output from the predictor or 0 according to the result of the decision unit 42 and outputs the selected value.

The operation of the present invention will be described hereinafter.

The input property information items are applied to the auto-correlation calculator 41, thus obtaining the auto-correlation. The auto-correlation obtained as mentioned above is compared with a predetermined threshold value (for example, 0.9) by the decision unit 42. A control signal for controlling a predictor used when the auto-correlation is larger than the predetermined threshold value, and controlling no predictor used when the auto-correlation is smaller than the predetermined threshold value, is generated and supplied to the selector 44.

The delay 43 used as the predictor in one embodiment of the present invention generates property information immediately before one step obtained by delaying the input property information as a prediction value $S_1$ of the current property information and supplies it to the selector 44. $0(S_0)$ is supplied to another input of the selector 44 for a case in which the predictor is not used. Therefore, when the selector selects 0, the subtracter 45 subtracts 0 which is the value selected by the selector 44, thus suppressing the operation of the predictor. The input selected by the selector 44 is selected according to the control signal supplied by the decision unit 42. The information of the prediction error signal obtained by the subtracter is compressed by the encoder 46 such as an arithmetic encoder.

According to the present invention, it is possible to effectively compress the surface property information of a three dimensional object when a certain three dimensional object is expressed by a three dimensional mesh. It is possible to construct the most suitable encoder according to an object to be encoded, by selecting an appropriate predictor, according to correlation with respect to an adjacent position in the property information of the three dimensional object.

What is claimed is:

1. A property information encoder for encoding property information of a two or three dimensional mesh object, comprising:

a quantizer for quantizing input property information;

a predictor for predicting currently input property information;

a selector for selecting either a prediction value output from the predictor or a predetermined value according to an operating mode input by user, and outputting the selected value;

a subtracter for subtracting a value output from the selector from a value output by the quantizer; and an encoder for compressing information of a prediction error signal output by the subtracter, wherein the selector operates in either a selection mode of selecting either a prediction value output from the predictor or a predetermined value according to a measured characteristic of said input property information, and outputting the selected value or a fixed mode for outputting a prediction value output by the predictor.

2. The encoder of claim 1, wherein the predictor is a delay for outputting immediately prior quantized property information as a prediction value with respect to current property information.

3. The encoder of claim 1, wherein the predictor combines current property information with property information items from a plurality of adjacent positions and outputs the combination result as a prediction value with respect to the current property information.

4. The encoder of claim 1, wherein the encoder is an entropy encoder.

* * * * *